United States Patent [19]
Curran et al.

[11] 3,708,791
[45] Jan. 2, 1973

[54] SEQUENTIAL MONITOR

[75] Inventors: Peter F. Curran, Westchester County; David A. Tawfik, Queens County, both of N.Y.; Robert L. James, Bloomfield, N.J.

[73] Assignee: The Bendix Coration

[22] Filed: Dec. 28, 1970

[21] Appl. No.: 101,646

[52] U.S. Cl..............340/248 A, 328/104, 328/147, 340/183
[51] Int. Cl...........................................G08b 21/00
[58] Field of Search........340/248 A, 213, 413, 223, 340/147 CN, 150, 183; 328/147, 154, 104; 340/147 C, 307/243, 251

[56] References Cited

UNITED STATES PATENTS

| 3,594,789 | 7/1971 | Rotier | 340/413 |
| 3,492,589 | 1/1970 | Rotier | 340/248 A |
| 3,551,824 | 12/1970 | Rotier | 328/147 |
| 3,579,120 | 5/1971 | Curran | 328/147 |
| 3,539,928 | 11/1970 | Gardner et al. | 328/104 |

Primary Examiner—Thomas B. Habecker
Assistant Examiner—Robert J. Mooney
Attorney—Anthony F. Cuoco and Plante, Hartz, Smith and Thompson

[57] ABSTRACT

A sequential monitor for comparing redundant signals appearing at various points in a control system and for providing an indication when the difference between the redundant signals exceeds a predetermined limit. The monitor is multiplexed in the system so that a single monitor suffices for comparing signals at all of the points and is fail safe in that it provides an indication for internal monitor malfunctions as well as for signal failures.

10 Claims, 2 Drawing Figures

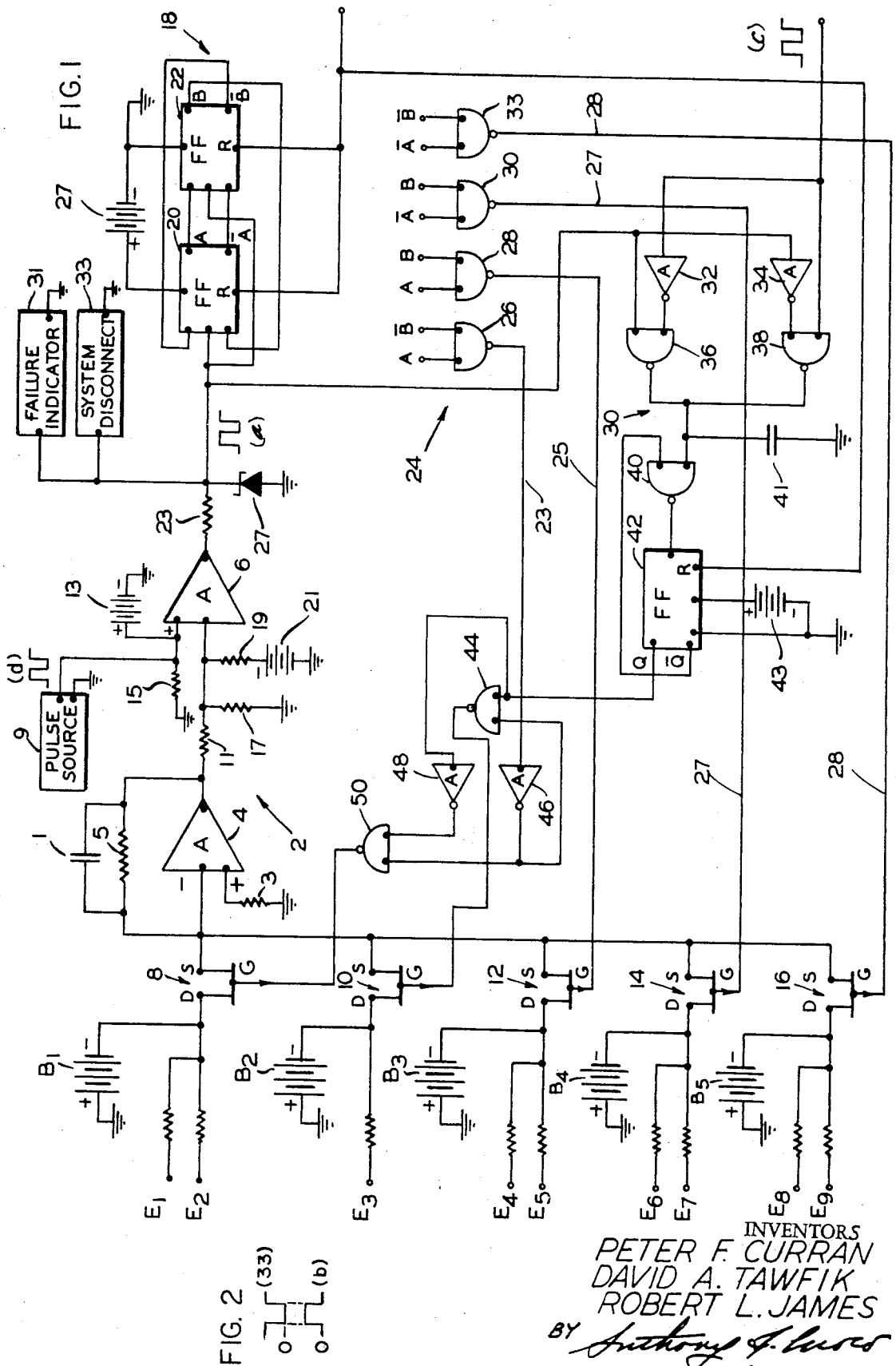

3,708,791

SEQUENTIAL MONITOR

BACKGROUND OF THE INVENTION

1. Field of the Invention

This invention relates to apparatus for sequentially monitoring redundant control signals and, more particularly, to apparatus of the type described which provides fail safe monitoring with simplified circuitry and increased accuracy.

2. Description of the Prior Art

Prior to the present invention monitors for sequentially monitoring redundant signals at various points in a control system required separate circuitry for each monitored point. This requires additional power and increases the cost and complexity of the monitor. The device of the present invention eliminates these disadvantages since only a single monitor circuit is required.

SUMMARY OF THE INVENTION

This invention contemplates a monitor wherein a plurality of pairs of redundant signals are sequentially applied to the monitor through a corresponding plurality of switches. If the signals in the pair being monitored correspond within predetermined limits the monitor provides an alternating signal which operates a switch for applying another pair of redundant signals to the monitor. If the limits are exceeded, the monitor provides a steady state signal which is ineffective for operating the switch and is effective for operating a failure indicator or a system disconnect device. The monitor is also effective for deferring failure indication when a selected pair of signals fails and for providing said indication when another selected pair of signals fails as well, whereupon the monitor provides an output which inhibits all further sequencing.

One object of this invention is to provide a single monitor for comparing pairs of sequentially applied redundant signals occurring at various points in a control system.

Another object of this invention is to provide a fail safe sequential monitor of the type described in that the monitor alarms for its own failures as well as for control signal failures.

Another object of this invention is to provide a monitor of the type described having simplified circuitry, fewer components and increased reliability as compared to monitors now known in the art.

Another object of this invention is to sequentially compare pairs of redundant signals, and if a selected pair of redundant signals fails a failure indication is deferred until another selected pair of signals fails, and whereupon all further sequencing is inhibited.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWINGS

FIG. 1 in the drawings is an electrical schematic diagram of a sequential monitor according to the invention.

FIG. 2 is a diagrammatic representation illustrating wave forms for reset pulse (b) and the output of decoder gate 33 shown in FIG. 1.

DESCRIPTION OF THE INVENTION

A pair of signals $E_1$ and $E_2$, equal in magnitude but opposite in polarity, appear at a point in, for example, an automatic flight control system and are to be monitored by the device of the present invention. Likewise, pairs of signals $E_4$, $E_5$; $E_6$, $E_7$; and $E_8$, $E_9$ are signals from other points in the automatic flight control system and are also to be monitored. Signal $E_3$ is a d.c. supply signal which is to be used for purposes hereinafter described.

Signals $E_1$ and $E_2$ and a d.c. signal from a source shown as a battery $B_1$ are applied to a monitor circuit 2 including amplifiers 4 and 6 through a field effect transistor switch 8 and signal $E_3$ and a d.c. signal from a source shown as a battery $B_2$ are applied to monitor 2 through a field effect transistor switch 10. Signals $E_4$, $E_5$ and a d.c. signal from a source shown as a battery $B_3$, signals $E_6$, $E_7$ and a d.c. signal from a source shown as a battery $B_4$ and signals $E_8$, $E_9$ and a d.c. signal from a source shown as a battery $B_5$ are applied to monitor 2 through field effect transistor switches 12, 14 and 16, respectively. Each of the transistor switches 8, 10, 12, 14 and 16 have Drain (D), Source (S) and Gate (G) elements with the respective drain elements receiving the applied signals and the source elements connected to amplifier 4 in monitor 2.

Normally monitor 2 provides at the output of amplifier 6 therein, a square wave signal shown in the figure and designated as (a). If the pair of signals being examined are faulty; that is if they do not correspond in magnitude within predetermined limits, then the output provided by amplifier 6, said amplifier being driven by pulses (d) from a pulse source 9, is a steady state signal instead of the normal alternating square wave signal (a). Resistors 3, 5 and a capacitor 8 are connected to amplifier 4 and resistors 11, 15, 17, 19 and 23, d.c. sources 13 and 21 and zener diode 27 are connected to amplifier 6 to establish proper circuit parameters and to modify the output of amplifier 6 for purposes of the invention as will be understood by those skilled in the art.

Thus, amplifiers 4 and 6 and their associated circuitry provide, in effect, a comparator. The output from battery $B_1$ is a "tracer" output which is combined by amplifier 4 with signals $E_1$ and $E_2$. If signals $E_1$ and $E_2$ correspond within predetermined limits, the output of amplifier 4 is the tracer output, adjusted by the gain of the amplifier. If the signals do not correspond, the output from amplifier 6 is at some higher level. The tracer output is required so that some output is always provided by amplifier 4 to indicate that the system is operating properly.

Amplifier 6 is in d.c. balance. If the input to amplifier 6 from amplifier 4 is the aforenoted gain adjusted tracer output, a small d.c. unbalance occurs. Pulses (a) from pulse source 9 are sufficient to overcome this unbalance and amplifier 6 provides a square wave output indicative that signals $E_1$ and $E_2$ are normal. If, on the other hand, the input to amplifier 6 is at the higher level, the pulses are insufficient to overcome the associated d.c. unbalance and amplifier 6 provides a steady state output indicative of faulty signals $E_1$ and $E_2$.

The signal from monitor 2 is applied to a counter 18 including dual flip-flops 20 and 22 which are driven by a d.c. source shown as a battery 27. Flip-flop 20 provides A and $\bar{A}$ logic outputs which are applied as inputs to flip-flop 22 and flip-flop 22 provides B and $\bar{B}$ logic outputs which are applied as inputs to flip-flop 20. Both flip-flops receive output ($a$) from monitor 2 and are reset by a pulse designated as ($b$) in the figure.

If the signals being monitored correspond within predetermined limits, square wave signal ($a$) provided by monitor 2 is in effect a clock pulse which drives decoder 24 including four dual input gates 26, 28, 30 and 32 connected to counter 18 outputs A, $\bar{B}$; A, B; $\bar{A}$, B and $\bar{A}$, $\bar{B}$, respectively, to provide a "1" output at corresponding output conductors 23, 25, 27, and 29 for rendering an appropriate field effect transistor switch conductive so that a new pair of signals is applied to the monitor for examination thereby. To this end conductor 23 is connected to the gate element of transistor 8 through an inverter 46 and a gate 50 and the gate element of transistor 10 is connected to an inverter 48 as will be further explained. Conductor 25 is connected to the gate element of transistor 12, conductor 27 is connected to the gate element of transistor 14 and conductor 29 is connected to the gate element of transistor 16.

If the signals being compared do not correspond with predetermined limits, counter 18 does not receive clock pulse ($a$) from monitor 2, but receive instead the aforenoted steady state signal and therefore does not sequence to the next counter state. This means that decoder 24 does not provide the "1" output at conductors 23, 25, 27 and 29 to render another field effect transistor switch conductive and the previous switch remains conductive indefinitely for sustaining application of the two faulty signals to the monitor, and whereupon the aforenoted steady state signal is provided for actuating a failure indicator 31 which may be a conventional type alarm bell or a system disconnect device 33 which may be a conventional type switch.

Sometime, in monitoring signals in a flight control system, it is desired to defer a failure indication for one pair of faulty control signals until it is found that a second pair of control signals is also faulty. This may be considered as OR type monitoring since either one pair of inputs signals or the other pair is sufficient to provide a normal ($a$) monitor output.

The circuitry for accomplishing this latter monitoring includes an exclusive OR gate 30 having inverters 32 and 34 connected to gates 36 and 38, respectively. The inputs to OR gate 30 are square wave ($a$) from monitor 2 and a reference square wave designated as ($c$) in the figure.

For purposes of illustration, if input signals $E_1$ and $E_2$ are faulty, a steady state output appears at the output of amplifier 6 in monitor 2 as heretofore noted. Gate 30, having gate 36 connected to the output of amplifier 6 applies successive "1" and "0" outputs to a gate 40 coupled to the output of gate 30 through a capacitor 41, since gate 30 no longer receives dual square wave inputs with square wave input ($a$) being absent.

Gate 40 receives a "1" output from the $\bar{Q}$ terminal of a flip-flop 42, and which flip-flop 42 is driven by a d.c. signal from a battery 43 and reset by pulse ($b$) for providing said "1" output. Therefore, gate 40 goes first to a "1" output and then to a "0" output, and drives flip-flop 42 to provide a "1" output at its Q terminal.

In this connection it is to be noted that reset pulse ($b$) occurs when gate 32 in decoder 24 provides an output pulse as shown in the timing diagram of FIG. 2. The reset pulse is applied to flip-flops 20, 22 and 42 which must be reset so that circuit operation is initially started in a definite state. The resetting of flip-flop 42, moreover, insures that field effect transistor 8 is turned on in appropriate sequence.

The "1" output provided by flip-flop 42 is applied to gate 44 and inverter 48 which is connected to gate 50. Gate 44 is connected to switch 10 as heretofore noted. Inverter 46 driven by gate 26 in decoder 24 is connected to gate 50, and which gate is connected to the gate element of transistor 8. Thus, when signals $E_1$, $E_2$ are faulty the action of gate 30, flip-flop 42 and gates 40, 44, 46, 48, 50 is to render transistor 8 nonconductive to block signal $E_1$ and $E_2$ and to render transistor 10 conductive to pass signal $E_3$ for affecting amplifier 6 to provide an alternating output and thereby preventing a sustained steady state failure signal from being provided by the monitor.

If a comparison of another pair of signals shows another failure, OR gate 30 still sends "1" and "0" outputs to gate 40, but the output of gate 40 remains a constant "1" since a constant "0" from flip-flop 42 controls its action. Thus, the second failure stops all sequencing of the monitor loop and a sustained steady state failure signal is provided at the output of amplifier 6 in monitor 2.

If the second failure had not occurred, the output from amplifier 6 would resume its normal square wave configuration, which in turn would sequence counter 18 thereby causing selection of the next pair of signals to be compared. If the first failure had not occurred, the counter would sequence normally but would omit selection of the second set of signals, the selection of which is outside its control.

As heretofore noted batteries $B_1$, $B_2$, $B_3$, $B_4$, and $B_5$ are connected to the drain elements of transistor switches 8, 10, 12, 14 and 16 respectively. The batteries apply constant level d.c. signals through the respective switches to the monitor. The d.c. signals provide a balance, and which balance must be overcome for the monitor to trip and provide at the output of amplifier 6 a constant level (failure) output. In this respect protection is provided against an erroneous failure signal when a component failure occurs such as one of the transistor switches being frozen closed.

It will now be understood that the logic components shown in the figure are of the standard type and are commercially available. For example, the flip-flops included in counter 18 may be of the dual monolithic type clocked JK flip-flops manufactured by the Fairchild Semiconductor Company and carrying their trade designation DT$\mu$9094 as described in a Fairchild Data Sheet, dated January 1967. Likewise flip-flop 42 may be one-half of component DT$\mu$9094.

Gates 36, 38, 40, 44 and 50 and the gates included in decoder 24 may be of the Quad two- input type manufactured by the Fairchild Semiconductor Company and carrying the trade designation DT$\mu$L 946 as described in a Fairchild Data Sheet, dated August 1964.

Inverters 32, 34, 46 and 48 may be of the type also manufactured by the Fairchild Instrument Company and carrying the trade designation DT$\mu$L9936 as described at pages 3-113 to 3-117 of a Fairchild Semiconductor Integrated Circuit Data Catalog, 1970.

It will be seen from the drawing and from the foregoing description thereof, that no component circuit in the monitor loop has to be fail safe in itself since its failures will be indicated by a change in the action of the entire monitor loop. This is a distinct advantage since otherwise the requirements of component fail safe circuits not only limits the performance of the monitor but makes it more complicated in configuration and more expensive to manufacture.

In essence, then a fail safe characteristic by loop action has been substituted for fail safe design of individual component circuits. Also, an advantage is realized in that the same monitoring equipment is used over and over by multiplexing instead of having a separate monitor at the various points in the system which are to be monitored.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for monitoring pairs of redundant signals at a plurality of points in a control system comprising:
    a plurality of switching means, each of which is connected to a corresponding point in the control system;
    a monitor connected to the plurality of switching means, with one of said switching means being initially effective for applying a corresponding pair of redundant signals to the monitor, said monitor providing an alternating output if the signals in said pair correspond within predetermined limits;
    a counter connected to the monitor and responsive to the alternating output from sequencing from an initial logic state to another logic state and for providing an output corresponding to said other logic state;
    a decoder connected to the counter and responsive to the output corresponding to the other logic state for providing a controlling output; and
    the plurality of switching means connected to the decoder, with another one of said switching means affected by the controlling output for sequentially applying a corresponding pair of redundant signals to the monitor.

2. Apparatus as described in claim 1, wherein:
    the monitor provides a constant level output if the signals in said pair do not correspond within the predetermined limits, said constant level output being ineffective for sequencing the counter from the initial logic state to the other logic state, whereupon the decoder is rendered ineffective for providing the controlling output.

3. Apparatus as described by claim 1, including:
    utilizing means connected to the monitor for utilizing the constant level output to render the control system in a failure mode.

4. Apparatus as described by claim 2, including:
    means for providing a signal at a predetermined level;
    a switching device connected to the predetermined level signal means and to the monitor;
    gating means connected to the counter, to the decoder, to the monitor, to a predetermined switching means of the plurality of switching means and to the switching device, and affected by the predetermined level signal, the controlling output and the alternating output for rendering the predetermined switching means ineffective for applying a corresponding pair of redundant signals to the monitor, and for rendering the switching device effective for applying the signal at a predetermined level to the monitor; and
    said monitor being responsive to the predetermined level signal for providing the alternating output.

5. Apparatus as described by claim 1, wherein each of the switching means in the plurality of switching means includes:
    a current flow control device having an input element, an output element and a control element;
    the input element connected to the corresponding point in the control system;
    the monitor connected to the output element; and
    the control element connected to the decoder.

6. Apparatus as described by claim 4, wherein the switching device includes:
    a current flow control device having an input element, an output element and a control element;
    the input element connected to the means for providing a signal at a predetermined level;
    the output element connected to the monitor; and
    the gating means connected to the control element.

7. Apparatus as described by claim 5, including:
    a source of constant level voltage connected to the input element of the current flow control device.

8. Apparatus as described by claim 1, wherein the counter includes:
    dual flip-flops, each of which has a pair of input terminals, a pair of output terminals, a biasing terminal, a clock terminal and a reset terminal;
    the input terminals of each of the dual flip-flops connected to the output terminals of the other of said flip-flops;
    the monitor connected to the clock terminals of each of the flip-flops;
    a source of constant level voltage connected to the biasing terminal of each of the flip-flops;
    a pulse source connected to the reset terminals of each of the flip-flops; and
    each of the dual flip-flops being responsive to the constant level voltage, the alternating monitor output and the pulses from the pulse source for providing at its output terminals outputs at one logic level and at another logic level.

9. Apparatus as described by claim 8, wherein the decoder includes:
    a plurality of gates each of which has a pair of input terminals connected to appropriate output terminals of the flip-flops for receiving predetermined combinations of logic outputs thereat, and an output terminal connected to a corresponding switching means for applying the controlling output thereto.

10. Apparatus as described by claim 4, wherein the gating means includes:

first means connected to the monitor and responsive to the constant level signal for alternately providing first and second signals;

second means connected to the counter and affected by the counter in the initial logic state for providing a third signal at a first output terminal;

third means connected to the first means and to the second means and responsive to the first, second and third signals for alternately providing fourth and fifth signals, said fourth and fifth signals affecting said second means for providing a sixth signal; and fourth means connected to the third means and to the decoder and affected by the sixth signal and the controlling output from the decoder provided when the monitor provides the alternating output for providing a seventh output for rendering the predetermined switching means ineffective for applying a corresponding pair of redundant signals to the monitor, and for providing an eighth output for rendering the switching device effective for applying the signal at a predetermined level to the monitor.

* * * * *